United States Patent
Wang et al.

(10) Patent No.: US 12,468,921 B2
(45) Date of Patent: Nov. 11, 2025

(54) PIPELINING AND PARALLELIZING GRAPH EXECUTION METHOD FOR NEURAL NETWORK MODEL COMPUTATION AND APPARATUS THEREOF

(71) Applicant: ZHEJIANG LAB, Hangzhou (CN)

(72) Inventors: Hongsheng Wang, Hangzhou (CN); Bowen Tan, Hangzhou (CN); Hujun Bao, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 822 days.

(21) Appl. No.: 17/838,342

(22) Filed: Jun. 13, 2022

(65) Prior Publication Data
US 2023/0351145 A1   Nov. 2, 2023

Related U.S. Application Data

(63) Continuation of application No. PCT/CN2022/092481, filed on May 12, 2022.

(30) Foreign Application Priority Data

Apr. 27, 2022   (CN) .......................... 202210447287.7

(51) Int. Cl.
G06N 3/04  (2023.01)
G06F 9/38  (2018.01)
G06F 16/901 (2019.01)

(52) U.S. Cl.
CPC ............. *G06N 3/04* (2013.01); *G06F 9/3885* (2013.01); *G06F 16/9024* (2019.01)

(58) Field of Classification Search
CPC ...... G06N 3/04; G06F 16/9024; G06F 9/3885
See application file for complete search history.

(56) References Cited

U.S. PATENT DOCUMENTS

2019/0362227 A1*  11/2019  Seshadri .............. G06N 3/0499
2022/0156469 A1*   5/2022  Wang ........................ G06J 1/00
(Continued)

FOREIGN PATENT DOCUMENTS

CN        112154462 A       12/2020
CN        112884086 A        6/2021
(Continued)

OTHER PUBLICATIONS

Zhiyu Wan. "A Study on Parallelization Strategy of Distributed Deep Learning" A Master's Degree Theses, Xidian University. Mar. 2021.

*Primary Examiner* — Haimei Jiang
*Assistant Examiner* — Thomas Bernard Lane
(74) *Attorney, Agent, or Firm* — IPro, PLLC

(57) ABSTRACT

The present disclosure provides a pipelining and parallelizing graph execution method for neural network model computation and apparatus, and provides a pipelining and parallelizing graph execution method for neural network model computation and apparatus in a deep learning training system. The method includes the graph execution flow in a neural network model computation process and a process of cooperative work of all functional modules. The pipelining and parallelizing graph execution method for neural network model computation includes creating a graph executive on a native machine according to a physical computation graph compiled and generated by a deep learning framework.

8 Claims, 3 Drawing Sheets

(56) References Cited

U.S. PATENT DOCUMENTS

| | | | | |
|---|---|---|---|---|
| 2022/0318614 A1* | 10/2022 | Bajic | .................. | G06F 9/4843 |
| 2023/0004871 A1* | 1/2023 | Sakharshete | ............. | G06N 3/04 |
| 2023/0083345 A1* | 3/2023 | Kelur | .................... | G06N 3/063 |
| | | | | 706/21 |
| 2023/0084951 A1* | 3/2023 | Fontaine | ................ | G06F 9/541 |
| | | | | 719/328 |
| 2023/0169408 A1* | 6/2023 | Andrade Costa | ...... | G06N 20/20 |
| | | | | 706/12 |

FOREIGN PATENT DOCUMENTS

| | | |
|---|---|---|
| CN | 114139702 A | 3/2022 |
| CN | 114186687 A | 3/2022 |
| CN | 114237918 A | 3/2022 |
| CN | 114548383 A | 5/2022 |

\* cited by examiner

|  | Computational graph flow → | | | | | | | | |
|---|---|---|---|---|---|---|---|---|---|
|  | T1 | T2 | T3 | T4 | T5 | T6 | T7 | T8 | T9 |
| r11 | a1 | a1 |  | C1 | C1 |  | a4 | a4 |  |
| r12 |  | a2 | a2 |  | C2 | C2 |  | a5 | a5 |
| r13 |  |  | a3 | a3 |  | C3 | C3 |  | a6 |
| r21 |  | b1 | b1 |  | B1 | B1 |  | b4 | b4 |
| r22 |  |  | b2 | b2 |  | B2 | B2 |  | b5 |
| r23 |  |  |  | b3 | b3 |  | B3 | B3 |  |
| r31 |  |  | c1 | c1 |  | A1 |  |  | c4 |
| r32 |  |  |  | c2 | c2 |  | A2 |  |  |
| r33 |  |  |  |  | c3 | c3 |  | A3 |  |

PIPELINING AND PARALLELIZING GRAPH EXECUTION METHOD FOR NEURAL NETWORK MODEL COMPUTATION AND APPARATUS THEREOF

CROSS REFERENCE TO RELATED APPLICATION

The present disclosure claims the benefit of priority to Chinese patent application No. 202210447287.7, filed on Apr. 27, 2022 to China National Intellectual Property Administration and titled "Pipelining and parallelizing graph execution method for neural network model computation and Apparatus thereof", which is incorporated herein by reference in its entirety.

FIELD

The present disclosure relates to the technical field of deep learning, in particular to a pipelining and parallelizing graph execution method for neural network model computation and apparatus.

BACKGROUND

With the rapid development of industrialization application of artificial intelligence, the demand for large models in practical application scenarios becomes increasingly urgent, and structures of machine learning workloads tend to become more and more complex large models, resulting in extremely high execution cost of graphs used for large model computations. Most of the existing graph execution methods for neural network model computation are based on synchronization methods, resulting in low resource utilization rate of an entire graph execution system, which limits a speedup ratio and throughput rate of a distributed system.

In order to solve the above problems, in a pipelining and parallelizing graph execution method for neural network model computation provided by the present disclosure, various batches of training data and different subgraphs are isolated, and each batch of training data flows through a forward computation graph and a backward computation graph sequentially in a 1F1B forward-backward manner. In the present disclosure, there is one batch of data being processed on each device process to keep all device processes busy without pipeline pause, and the entire pipeline is relatively balanced. At the same time, it can be ensured that parameter updates on each subgraph are performed at a fixed cycle, which also helps prevent too many mini-batches from being processed at the same time and ensures model convergence.

SUMMARY

The present disclosure aims to provide a pipelining and parallelizing graph execution method for neural network model computation and apparatus, so as to overcome the shortcomings in the prior art.

In order to achieve the above purposes, the present disclosure provides the following technical solution:

The present application discloses a pipelining and parallelizing graph execution method for neural network model computation. Several executives are set in a neural network model; a total of 2*N executives are provided, and N is a positive integer; and several memory blocks are set in the executive. The method specifically includes the following steps:

S1, dividing training data into several batches of subdata;

S2, inputting the several batches of subdata into a neural network model in sequence; after an ith batch of subdata is input, executing, by an nth executive, self-kernel function computation on the ith batch of subdata, and writing an execution result into an idle memory block of the nth executive; then inputting an (i+1)th batch of subdata, wherein i and n are both positive integers;

S3, after the (i+1)th batch of subdata is input, executing, by the nth executive, the operation in S2 on the (i+1)th batch of subdata, and sending an address of the memory block where the ith batch is located to an (n+1)th executive; parsing, by the (n+1)th executive, the memory block where the ith batch is located to obtain an execution result of the nth executive on the ith batch of subdata, executing the self-kernel function computation by taking the execution result of the nth executive as input data of the (n+1)th executive, and writing the execution result into an idle memory block of the (n+1)th executive; then inputting an (i+2)th batch of subdata;

S4, after the (i+2)th batch of subdata is input, executing, by the nth executive, the operation in S2 on the (i+2)th batch of subdata, and executing, by the nth executive and the (n+1)th executive, the operation in S3 on the (i+1)th batch of subdata; at the same time, sending, by the (n+1)th executive, the address of the memory block where the ith batch is located to an (n+2)th executive; parsing, by the (n+2)th executive, the memory block where the ith batch is located to obtain an execution result of the (n+1)th executive on the ith batch of subdata, executing the self-kernel function computation by taking the execution result of the (n+1)th executive as input data of the (n+2)th executive, and writing the execution result into an idle memory block of the (n+2)th executive;

S5, reclaiming, by the nth executive, the memory block sent to the (n+1)th executive;

S6, executing, by the last executive, the self-kernel function computation; writing the execution result to a memory block of the last executive; and immediately reclaiming the memory block on its own at the end of the execution.

Preferably, before executing the self-kernel function computation, an executive may check whether there is an idle memory block in the executive, execute the self-kernel function computation on the ith batch of subdata if there is an idle memory block, and otherwise, instruct the ith batch to wait for an idle memory block.

Preferably, for an $[(N*n+1)]$th batch of subdata, before executing the self-kernel function computation, the executive may check whether the executive where an $(N*n-1)$th batch of subdata is located completes execution, wherein n is a positive integer.

Preferably, the step S5 specifically includes the following operations:

S51, informing, by the (n+1)th executive, the nth executive that the memory block sent to the (n+1)th executive has been consumed;

S52, reclaiming, by the nth executive, the memory block sent to the (n+1)th executive, and marking the memory block as being free.

Preferably, the method further includes constructing an executive, and the constructing an executive specifically includes the following substeps:

S01, creating an operator kernel function task queue: adding a current operator kernel function computation task into a current kernel function task queue in sequence;

S02, creating a thread of an executive: acquiring, by the thread of the executive, a current task to be processed in sequence from the kernel function task queue, and submitting the current task to be processed to a thread pool;

S03, creating an executive of a kernel function: creating an executive used for operator kernel function computation according to a current kernel function task and context information of a current thread, and using the executive to run the kernel function task in the task queue;

S04, creating an event recall queue: adding tasks that have been processed by a task executive into an event recall queue;

S05, creating a thread of the event recall queue: taking out and returning, by the thread of the event recall queue, the tasks that have been processed in the event recall queue.

The present disclosure further discloses a neural network model computation-oriented graph execution apparatus, including an executive construction module and an executive pipelining and parallelizing working module; the executive construction module is configured to construct an executive; and the executive pipelining and parallelizing working module is configured to implement the above-mentioned pipelining and parallelizing graph execution method for neural network model computation.

The present disclosure further discloses a neural network model computation-oriented graph execution apparatus, including a memory and one or more processors. The memory stores an executable code. The one or more processors, when executing the executable code, implement the above-mentioned pipelining and parallelizing graph execution method for neural network model computation.

The present disclosure further provides a computer-readable storage medium on which a program is stored. The program, when executed by a processor, implements the above-mentioned pipelining and parallelizing graph execution method for neural network model computation.

The present disclosure has the beneficial effects.

According to the pipelining and parallelizing graph execution method for neural network model computation and apparatus, a graph executive on a native machine is created according to a physical computation graph compiled and generated by a deep learning framework. By designing a solution for allocating a plurality of idle memory blocks to each graph executive, an entire computation graph simultaneously participates in deep learning training tasks of different batches of data in a pipelining and parallelizing manner. The parallel execution method of graph executives based on a plurality of free tensor storage blocks disclosed in the present disclosure can achieve distributed training of large models more easily than the existing method. In a distributed application scenario of a large-scale deep neural network, the present disclosure has a low threshold for users, and enables a model to learn the intrinsic correlation of a large number of data flowing into a neural network in batches, so as to obtain the "intelligent" sensation and judgment ability in a corresponding scenario. The present disclosure provides a set of simple and easy-to-use neural network model operation apparatus for algorithm engineers related to deep learning, so that the deep learning model can be conveniently trained.

The features and advantages of the present disclosure will be described in detail in combination with the embodiments and accompanying drawings.

DETAILED DESCRIPTION OF THE EMBODIMENTS

In order to make the objectives, technical solutions and advantages of the present disclosure clearer, the present disclosure will be further described below in detail with reference to accompanying drawings and embodiments. It should be understood that the specific embodiments described here are merely to explain the present disclosure, and not intended to limit the scope of the present disclosure. In addition, in the following descriptions, the descriptions of known structures and known art are omitted to avoid unnecessary confusion of the concept of the present disclosure.

Figure 1:
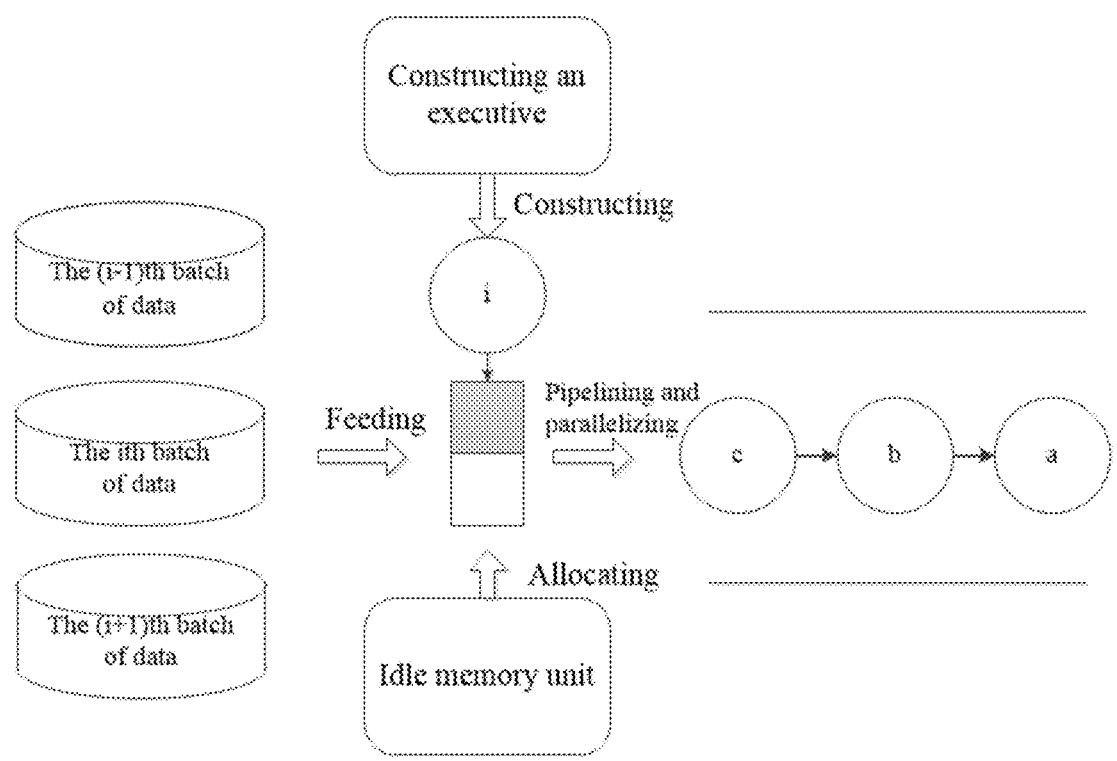
FIG. 1 is an architecture diagram of a pipelining and parallelizing graph execution method for neural network model computation.

As shown in FIG. 1, an architecture diagram of a pipelining and parallelizing graph execution method for neural network model computation is illustrated. As shown in the figure, training data is fed into a neural network model in batches; a graph executive on the native machine is created according to a physical computation graph compiled and generated by a deep learning framework; a plurality of idle memory blocks are allocated for each graph executive, so that the entire computation graph simultaneously participates in a deep learning training task in a pipelining and parallelizing manner. Specific operations are as follows:

S1, dividing training data into several batches of subdata;

S2, inputting the several batches of subdata into the neural network model in sequence; after an ith batch of subdata is input, executing, by an nth executive, self-kernel function computation on the ith batch of subdata, and writing an execution result into an idle memory block of the nth executive; then inputting an (i+1)th batch of subdata, wherein i and n are both positive integers;

S3, after the (i+1)th batch of subdata is input, executing, by the nth executive, the operation in S2 on the (i+1)th batch of subdata, and sending an address of the memory block where the ith batch is located to an (n+1)th executive; parsing, by the (n+1)th executive, the memory block where the ith batch is located to obtain an execution result of the nth executive on the ith batch of subdata, executing the self-kernel function computation by taking the execution result of the nth executive as input data of the (n+1)th executive, and writing the execution result into an idle memory block of the (n+1)th executive; then inputting an (i+2)th batch of subdata;

S4, after the (i+2)th batch of subdata is input, executing, by the nth executive, the operation in S2 on the (i+2)th batch of subdata, and executing, by the nth executive and the (n+1)th executive, the operation in S3 on the (i+1)th batch of subdata; at the same time, sending, by the (n+1)th executive, the address of the memory block where the ith batch is located to an (n+2)th executive; parsing, by the (n+2)th executive, the memory block where the ith batch is located to obtain an execution result of the (n+1)th executive on the ith batch of subdata, executing the self-kernel function computation by taking the execution result of the (n+1)th executive as input data of the (n+2)th executive, and writing the execution result into an idle memory block of the (n+2)th executive;

S5, reclaiming, by the nth executive, the memory block sent to the (n+1)th executive;

S6, executing, by the last executive, the self-kernel function computation; writing the execution result to a memory block of the last executive; and immediately reclaiming the memory block on its own at the end of the execution.

In one feasible embodiment, before executing the self-kernel function computation, an executive may check whether there is an idle memory block in the executive, execute the self-kernel function computation on the ith batch of subdata if there is an idle memory block, and otherwise, instruct the ith batch to wait for an idle memory block.

In one feasible embodiment, for an (N*n+1)th batch of subdata, before executing the self-kernel function computation, the executive may check whether the executive where an (N*n−1)th batch of subdata is located completes execution, wherein n is a positive integer.

In one feasible embodiment, the step S5 specifically includes the following operations:

S51, informing, by the (n+1)th executive, the nth executive that the memory block sent to the (n+1)th executive has been consumed;

S52, reclaiming, by the nth executive, the memory block sent to the (n+1)th executive, and marking the memory block as being free.

In one feasible embodiment, the method further includes constructing an executive, and the constructing an executive specifically includes the following substeps:

S01, creating an operator kernel function task queue: adding a current operator kernel function computation task into a current kernel function task queue in sequence;

S02, creating a thread of an executive: acquiring, by the thread of the executive, a current task to be processed in sequence from the kernel function task queue, and submitting the current task to be processed to a thread pool;

S03, creating an executive of a kernel function: creating an executive used for operator kernel function computation according to a current kernel function task and context information of a current thread, and using the executive to run the kernel function task in the task queue;

S04, creating an event recall queue: adding tasks that have been processed by a task executive into an event recall queue;

S05, creating a thread of the event recall queue: taking out and returning, by the thread of the event recall queue, the tasks that have been processed in the event recall queue.

A neural network model computation-oriented graph execution apparatus includes an executive construction module and an executive pipelining and parallelizing working module.

Figure 2:
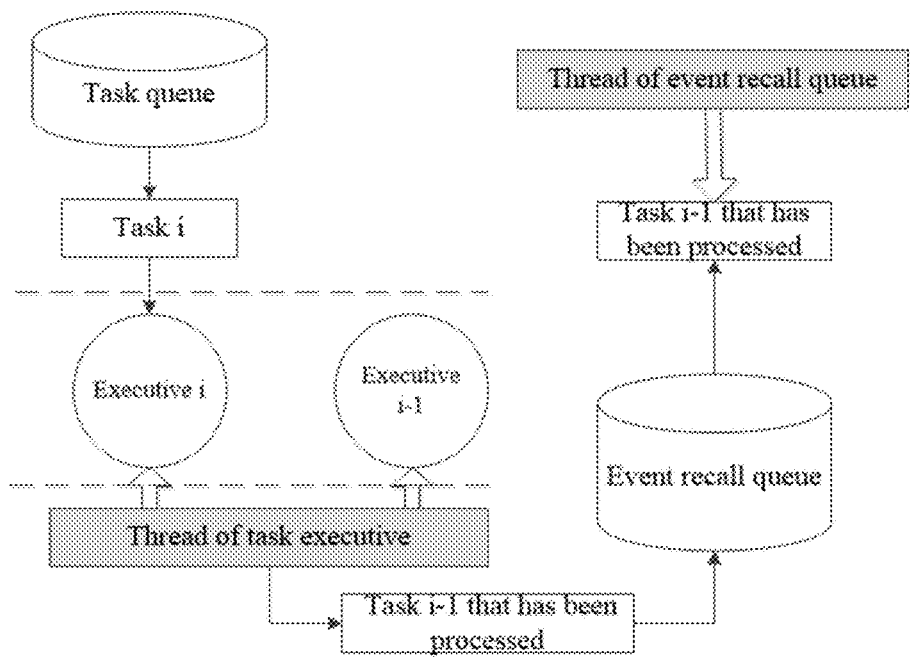
FIG. 2 is a flowchart of creating and managing a task executive thread module.

Referring to FIG. 2, the executive construction module includes the following basic actions:

creating an operator kernel function task queue: adding a current operator kernel function computation task into a current kernel function task queue in sequence;

creating a thread of a task executive: creating a thread of a task executive, wherein the thread of the task executive is in charge of acquiring a current task to be processed in sequence from the task queue, and submitting the current task to be processed to a thread pool when a server receives a request, and continuing to wait for other requests; if there is one available thread in the pool, the thread will be awakened, and the request will be served immediately; if there is no available thread in the pool, the task will be queued until there is a free thread; once one thread completes its service, the thread will return to the pool and wait for more jobs; when the task submitted to the thread pool can be asynchronously executed, the thread pool can work well;

creating a task executive of a kernel function: creating a task executive used for operator kernel function computation according to a current kernel function task and context information of a current thread, and using the task executive to run the kernel function task in the task queue;

creating an event recall queue: when all the task executives in the task queue have been processed, creating an event recall queue, and adding the tasks that have been processed by the task executive into the event recall queue in sequence;

creating a thread of the event recall queue: creating a thread of the event recall queue, wherein the thread of the event recall queue is in charge of taking out and returning the tasks that have been processed in the event recall queue.

Figure 3:
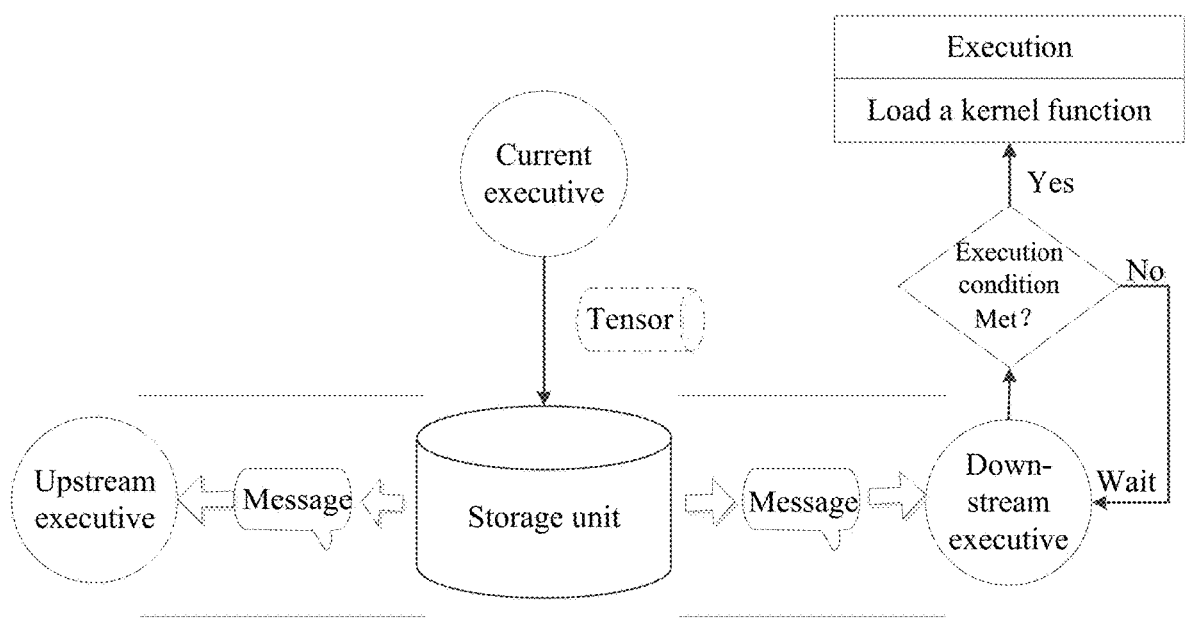
FIG. 3 is a basic action of a pipelining and parallelizing working module of a task executive.

Referring to FIG. 3, the executive pipelining and parallelizing work module includes the following basic actions: an executive inputs data; a current executive sends a message to a downstream executive; the downstream executive prepares tensor data to be consumed; the current executive sends a message to an upstream executive; the upstream executive reclaims tensor data that has been consumed; and the last executive reclaims computation data on its own.

An executive inputs data: At time t, for an ith batch of data, the executive inputs the ith batch of data, loads an operator kernel function computation task inside, executes kernel function computation, generates output tensor data of the kernel function computation task, and writes an execution result into an idle memory block.

A current executive sends a message to a downstream executive: At time t, for the ith batch of data, tensor data generated by the current executive is stored to an empty storage unit, and an address of the storage unit and an identity identification number of the downstream executive corresponding to the current executive are packaged into a message; the message is then sent to a target executive; and the target executive is the downstream executive corresponding to the current executive.

The downstream executive prepares tensor data to be consumed: At time t, for the ith batch of data, the downstream executive receives the message, and parses the tensor data generated by the current executive from the message, and the tensor data will be used as an input tensor when the downstream executive operates its operator kernel function; the downstream executive checks whether there is an available free memory block among memory blocks produced by the downstream executive; if it is found that there is an available free memory block, the downstream executive executes a corresponding operator kernel function computation task and reads the free memory block; and the downstream executive writes an output tensor result generated by execution into the memory block.

The current executive sends a message to an upstream executive: At time t, for the ith batch of data, the executive sends a message to an upstream producer executive to inform the upstream producer executive that the executive has consumed the memory block of the upstream producer executive; and the upstream executive may reclaim its storage unit for output tensor data.

The upstream executive reclaims data that has been consumed: At time t, for the ith batch of data, once the upstream executive receives a reclaiming message sent by the downstream executive, the upstream executive starts to check whether the memory blocks have been consumed by all the consumer executives, reclaims the memory blocks if the memory blocks have been consumed by all the consumer executives, and marks the memory blocks as free blocks.

The last executive reclaims computation data on its own: At time t, for the ith batch of data, the last executive executes a corresponding operator kernel function computation task, and writes the task into its own free memory block; and the executive A immediately reclaims the memory block after completing the execution.

Figures 4, 5:
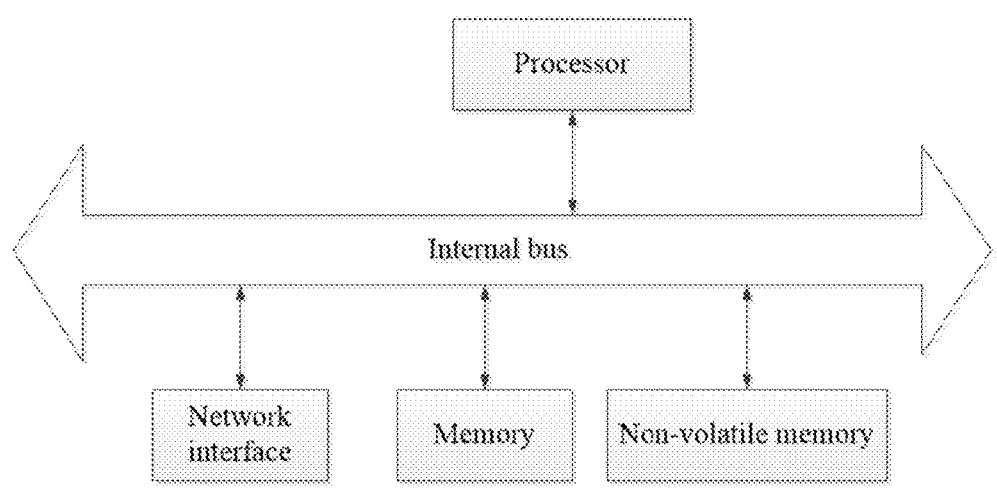
FIG. 4 is a pipelining and parallelizing execution process of executives.
FIG. 5 is a structural schematic diagram of a neural network model computation-oriented pipelining and parallelizing graph execution apparatus.

The embodiment of the neural network model computation-oriented graph execution apparatus of the present disclosure can be applied to any device with data processing capability. Any device with data processing capability may be a device or apparatus such as a computer. The apparatus embodiment may be implemented by software, or may be implemented by hardware or a combination of software and hardware. Implementation by software is taken as an example, an apparatus in a logical sense is formed by reading corresponding computer program instructions in a nonvolatile memory into an internal memory through a processor of any device with the data processing capability where it is located. In terms of hardware, as shown in FIG. 5, a hardware structure diagram of any device with the data processing capability where the neural network model computation-oriented graph execution apparatus of the present disclosure is located is illustrated. In addition to the processor, an internal memory, a network interface, and a nonvolatile memory shown in FIG. 5, any device with the data processing capability where the apparatus in the embodiment is located may also include other hardware usually according to the actual functions of any device with the data processing capability, and repeated descriptions are omitted here. For details of the implementation process of the functions and effects of all units in the above apparatus, the implementation processes of the corresponding steps in the above method are referred to, and repeated descriptions are omitted here.

For the apparatus embodiment, since it basically corresponds to the method embodiment, reference may be made to the partial description of the method embodiment for related parts. The device embodiments described above are only illustrative, and the units described as separate components may or may not be physically separated, and the components displayed as units may or may not be physical units, that is, they may be located in one place, or may be distributed over multiple network units. Some or all of the modules may be selected according to actual needs to achieve the objectives of the solutions of the present disclosure. Those of ordinary skill in the art can understand and implement it without creative effort.

An embodiment of the present disclosure further provides a computer-readable storage medium on which a program is stored. The program, when executed by a processor, implements the neural network model computation-oriented graph execution apparatus in the above embodiment.

The computer-readable storage medium may be an internal storage unit of any device with the data processing capability described in any of the foregoing embodiments, such as a hard disk or a memory. The computer-readable storage medium may also be an external storage device of any device with the data processing capability, such as a plug-in hard disk, a smart media card (SMC), an SD card, and a flash card. Further, the computer-readable storage medium may also include both an internal storage unit and an external storage device of any device with the data processing capability. The computer-readable storage medium is used for storing the computer program and other programs and data required by any device with the data processing capability, and can also be used for temporarily storing data that has been output or will be output.

EMBODIMENT

Referring to FIG. 4, a constructed physical computation graph is composed of forward operator x→forward operator y→forward operator z and backward operator Z→backward operator Y→backward operator X; executives for running own kernel functions are respectively created according to all the operators to correspondingly form execution computation graphs of executive a→executive b→executive c→executive C→executive B→executive A; and execution of the executives are initiated to run an entire computation graph in parallel.

At time T1:

A first batch of data is input, and executive a inputs the data: executive a runs a kernel function of forward operator x and writes an output tensor of a running result into free memory block r11.

Executive b, executive c, executive C, executive B and executive A are in a standby state since there is no readable input tensor data.

At time T2:

For a second batch of data, executive a inputs the data: executive a may also check whether there is a writable free block in executive a; if any, at time T2, executive a also executes the second batch of data and writes an execution result into free memory block r12.

At the same time, for the first batch of data, current executive a sends a message to downstream executive b, and downstream executive b prepares tensor data to be consumed: executive a sends a message to executive b to inform executive b of reading memory block r11 produced by executive a; executive b receives the message and checks whether there is an available free memory block among memory blocks b produced by executive b; if available free memory block r21 is found, at time T2, executive b executes a kernel function computation task of forward operator b and reads memory block r11; and executive b writes an output tensor result generated by the execution into memory block r21.

Whereupon executive a and executive b start to work in parallel. Executives c, C, B and A are still standby since there is no readable data.

At time T3:

For a third batch of data, executive a inputs the data: executive a may also check whether there is a writable free block in executive a; if any, executive a also executes the third batch of data and writes an execution result into free memory block r13.

At the same time, for the first batch of data, current executive b sends a message to downstream executive c, downstream executive c prepares tensor data to be consumed, current executive b sends a message to upstream executive a, and upstream executive a reclaims the tensor data that has been consumed: executive b produces memory block r21, and whereupon sends a message to downstream consumer executive c to inform executive c of reading memory block r21 produced by executive b; executive c receives memory block r21 and finds that there is free memory block r31 in executive c, whereupon executive c starts execution to read memory block r21 and writes a result into memory block r31. At the same time, executive b sends a message to upstream producer executive a to inform executive a that executive b has finished using memory block r1 of executive a; executive a receives memory block r11 that is returned by executive b after use and checks whether all consumers have finished using memory block r11, and then reclaims memory block r11 and marks memory block r11 as a free block.

At the same time, for the second batch of data, current executive a sends a message to downstream executive b, and downstream executive b prepares tensor data to be consumed: executive a sends a message to executive b to inform executive b of reading memory block r12 produced by executive a; executive b receives the message and checks whether there is an available free memory block among memory blocks b produced by executive b; if available free memory block r22 is found, executive b executes a kernel function computation task of forward operator b and reads memory block r12; and executive b writes an output tensor result generated by the execution into memory block r22.

Then executive a, executive b and executive c start to work in parallel.

Executives C, B and A are still standby since there is no readable data.

At time T4:

For a fourth batch of data, executive a inputs the data: executive a may also simultaneously check whether there is a writable free memory block in executive and whether executive A has completed the execution; and if no, executive a waits and does not enter the pipeline.

At the same time, for the first batch of data, current executive c sends a message to downstream executive C, downstream executive C prepares tensor data to be consumed, current executive c sends a message to upstream executive b, and upstream executive b reclaims the tensor data that has been consumed: executive c produces memory block r31, and whereupon sends a message to downstream consumer executive C to inform executive C of reading memory block r31 produced by executive c; executive C receives memory block r31 and finds that there is free memory block r11 in executive C, whereupon executive C starts execution to read memory block r31 and writes a result into memory block r11. At the same time, executive c sends a message to upstream producer executive b to inform executive b that executive c has finished using memory block r21 of executive b; executive b receives memory block r21 that is returned by executive c after use and checks whether all consumers have finished using memory block r21, and then reclaims memory block r21 and marks memory block r21 as a free block.

At the same time, for the second batch of data, current executive b sends a message to downstream executive c, downstream executive c prepares tensor data to be consumed, current executive b sends a message to upstream executive a, and upstream executive a reclaims the tensor data that has been consumed: executive b produces memory block r22, and whereupon sends a message to downstream consumer executive c to inform executive c of reading memory block r22 produced by executive b; executive c receives memory block r22 and finds that there is free memory block r32 in executive c, whereupon executive c starts execution to read memory block r22 and writes a result into memory block r32. At the same time, executive b sends a message to upstream producer executive a to inform executive a that executive b has finished using memory block r12 of executive a; executive a receives memory block r12 that is returned by executive b after use and checks whether all consumers have finished using memory block r12, and then reclaims memory block r12 and marks memory block r12 as a free block.

At the same time, for the third batch of data, current executive a sends a message to downstream executive b, and downstream executive b prepares tensor data to be consumed: executive a sends a message to executive b to inform executive b of reading memory block r13 produced by executive a; executive b receives the message and checks whether there is an available free memory block among memory blocks b produced by executive b; if available free memory block r23 is found, executive b executes a kernel function computation task of forward operator b and reads memory block r13; and executive b writes an output tensor result generated by the execution into memory block r23.

Then executive a, executive b, executive c and executive C start to work in parallel. Executives B and A are still standby since there is no readable data.

At time T5:

For a fourth batch of data, executive a inputs the data: executive a may also simultaneously check whether there is a writable free memory block in executive a and whether executive A has completed the execution; and if no, executive a waits and does not enter the pipeline.

At the same time, for the first batch of data, current executive c sends a message to downstream executive C, downstream executive C prepares tensor data to be consumed, current executive c sends a message to upstream executive b, and upstream executive b reclaims the tensor data that has been consumed: executive c produces memory block r11, and whereupon sends a message to downstream consumer executive B to inform executive B of reading memory block r11 produced by executive c; executive B receives memory block r11 and finds that there is free memory block r21 in executive B, whereupon executive B starts execution to read memory block r11 and writes a result into memory block r21. At the same time, executive C sends a message to upstream producer executive c to inform executive c that executive C has finished using memory block r31 of executive c; executive c receives memory block r31 that is returned by executive C after use and checks whether all consumers have finished using memory block r31, and then reclaims memory block r31 and marks memory block r31 as a free block.

At the same time, for the second batch of data, current executive c sends a message to downstream executive C, downstream executive C prepares tensor data to be consumed, current executive c sends a message to upstream executive b, and upstream executive b reclaims the tensor data that has been consumed: executive c produces memory block r32, and whereupon sends a message to downstream consumer executive C to inform executive C of reading memory block r32 produced by executive c; executive C receives memory block r32 and finds that there is free memory block r12 in executive C, whereupon executive C starts execution to read memory block r32 and writes a result into memory block r12. At the same time, executive c sends a message to upstream producer executive b to inform executive b that executive c has finished using memory block r22 of executive b; executive b receives memory block r22 that is returned by executive c after use and checks whether all consumers have finished using memory block r22, and then reclaims memory block r22 and marks memory block r22 as a free block.

At the same time, for the third batch of data, current executive b sends a message to downstream executive c, downstream executive c prepares tensor data to be consumed, current executive b sends a message to upstream executive a, and upstream executive a reclaims the tensor data that has been consumed: executive b produces memory block r23, and whereupon sends a message to downstream consumer executive c to inform executive c of reading memory block r23 produced by executive b; executive c receives memory block r23 and finds that there is free memory block r33 in executive c, whereupon executive c starts execution to read memory block r23 and writes a result into memory block r33. At the same time, executive b sends a message to upstream producer executive a to inform executive a that executive b has finished using memory block r13 of executive a; executive a receives memory block r13 that is returned by executive b after use and checks whether all consumers have finished using memory block r13, and then reclaims memory block r13 and marks memory block r13 as a free block.

Then executive a, executive b, executive c, executive C and executive B start to work in parallel. Executive A is still standby since there is no readable data.

At time T6:

For a fourth batch of data, executive a inputs the data: executive a may also simultaneously check whether there is a writable free memory block in executive a and whether executive A has completed the execution; and if no, executive a waits and does not enter the pipeline.

At the same time, for the first batch of data, current executive B sends a message to downstream executive A, and downstream executive A prepares tensor data to be consumed, then downstream executive A reclaims computation data on its own, current executive B sends a message to upstream executive C, and upstream executive C reclaims the tensor data that has been consumed: executive B produces memory block r21, and whereupon sends a message to downstream consumer executive A to inform executive A of reading memory block r21 produced by executive B; executive A receives memory block r21 and finds that there is free memory block r31 in executive A, whereupon executive A starts execution to read memory block r21 and writes a result into memory block r31; and executive A immediately reclaims memory block r31 on its own after completing the execution. At the same time, executive B sends a message to upstream producer executive C to inform executive C that executive B has finished using memory block r11 of executive C; executive C receives memory block r11 that is returned by executive B after use and checks whether all consumers have finished using memory block r11, and then reclaims memory block r11 and marks memory block r11 as a free block.

At the same time, for the second batch of data, current executive C sends a message to downstream executive B, downstream executive B prepares tensor data to be consumed, current executive C sends a message to upstream executive c, and upstream executive c reclaims the tensor data that has been consumed: executive C produces memory block r12, and whereupon sends a message to downstream consumer executive B to inform executive B of reading memory block r12 produced by executive C; executive B receives memory block r12 and finds that there is free memory block r22 in executive B, whereupon executive B starts execution to read memory block r12 and writes a result into memory block r22. At the same time, executive C sends a message to upstream producer executive c to inform executive c that executive C has finished using memory block r32 of executive c; executive c receives memory block r32 that returned by executive C after use and checks whether all consumers have finished using memory block r32, and then reclaims memory block r32 and marks memory block r32 as a free block.

At the same time, for the third batch of data, current executive c sends a message to downstream executive C, downstream executive C prepares tensor data to be consumed, current executive c sends a message to upstream executive b, and upstream executive b reclaims the tensor data that has been consumed: executive c produces memory block r33, and whereupon sends a message to downstream consumer executive C to inform executive C of reading memory block r33 produced by executive c; executive C receives memory block r33 and finds that there is free memory block r13 in executive C, whereupon executive C starts execution to read memory block r33 and writes a result into memory block r13. At the same time, executive c sends a message to upstream producer executive b to inform executive b that executive c has finished using memory block r23 of executive b; executive b receives memory block r23 that is returned by executive c after use and checks whether all consumers have finished using memory block r23, and then reclaims memory block r23 and marks memory block r23 as a free block.

Then executive a, executive b, executive c, executive C, executive B and executive A all start to work in parallel.

At time T7:

For a fourth batch of data, executive a inputs the data: executive a may also simultaneously check whether there is a writable free block in executive a and whether executive A completes the execution; if any, executive a also executes the fourth batch of data and writes an execution result into free memory block r11.

At the same time, for the first batch of data, all the executives complete the execution.

At the same time, for the second batch of data, current executive B sends a message to downstream executive A, downstream executive A prepares tensor data to be consumed, current executive B sends a message to upstream executive C, and upstream executive C reclaims the tensor data that has been consumed: executive B produces memory block r22, and whereupon sends a message to downstream consumer executive A to inform executive A of reading memory block r22 produced by executive B; executive A receives memory block r22 and finds that there is free memory block r32 in executive A, whereupon executive A starts execution to read memory block r22 and writes a result into memory block r32; and executive A immediately reclaims memory block r32 on its own after completing the execution. At the same time, executive B sends a message to upstream producer executive C to inform executive C that executive B has finished using memory block r12 of executive C; executive C receives memory block r12 that is returned by executive B after use and checks whether all consumers have finished using memory block r12, and then reclaims memory block r12 and marks memory block r12 as a free block.

At the same time, for the third batch of data, current executive C sends a message to downstream executive B, downstream executive B prepares tensor data to be consumed, current executive C sends a message to upstream executive c, and upstream executive c reclaims the tensor data that has been consumed: current executive c sends a message to downstream executive C, downstream executive C prepares tensor data to be consumed, current executive c sends a message to upstream executive b, and upstream executive b reclaims the tensor data that has been consumed: executive c produces memory block r13, and whereupon sends a message to downstream consumer executive B to inform executive B of reading memory block r13 produced by executive C; executive B receives memory block r13 and finds that there is free memory block r23 in executive B, whereupon executive B starts execution to read memory block r13 and writes a result into memory block r23. At the same time, executive C sends a message to upstream producer executive c to inform executive c that executive C has finished using memory block r33 of executive c; executive c receives memory block r33 that is returned by executive C after use and checks whether all consumers have finished using memory block r33, and then reclaims memory block r33 and marks memory block r33 as a free block. Then executive a, executive b, executive c and executive C start to work in parallel. Executives B and A are still standby since there is no readable data.

At time T8:

Executives a, b, c, C, B and A all work. At this time, the executives for one batch of data all complete the execution and a next batch of data is input. By means of the design of a plurality of idle memory blocks, the executives achieve pipelining and parallelizing work.

The above embodiments are only the preferred embodiments of the present disclosure, and are not intended to limit the present disclosure. Any modifications, equivalent replacements or improvements that are made within the spirit and principle of the present disclosure shall fall within the protection scope of the present disclosure.

What is claimed is:

1. A pipelining and parallelizing graph execution method for neural network model computation, wherein several executives are provided in a neural network model; a total of 2*N executives are provided, and N is a positive integer; several memory blocks are provided in the executive; the method specifically comprises the following steps:

S1, dividing training data into several batches of subdata;

S2, inputting the several batches of subdata into the neural network model in sequence; executing, by an nth executive, self-kernel function computation on an ith batch of subdata after the ith batch of subdata is input, and writing an execution result into an idle memory block of the nth executive; then inputting an (i+1)th batch of subdata, wherein i and n are both positive integers;

S3, executing, by the nth executive, the operation in S2 on the (i+1)th batch of subdata, and sending an address of the memory block where the ith batch is located to an (n+1)th executive after the (i+1)th batch of subdata is input; parsing, by the (n+1)th executive, the memory block where the ith batch is located to obtain an execution result of the nth executive on the ith batch of subdata, executing the self-kernel function computation by taking the execution result of the nth executive as input data of the (n+1)th executive, and writing the execution result into an idle memory block of the (n+1)th executive; then inputting an (i+2)th batch of subdata;

S4, executing, by the nth executive, the operation in S2 on the (i+2)th batch of subdata, and executing, by the nth executive and the (n+1)th executive, the operation in S3 on the (i+1)th batch of subdata after the (i+2)th batch of subdata is input; at the same time, sending, by the (n+1)th executive, the address of the memory block where the ith batch is located to an (n+2)th executive; parsing, by the (n+2)th executive, the memory block where the ith batch is located to obtain an execution result of the (n+1)th executive on the ith batch of subdata, executing the self-kernel function computation by taking the execution result of the (n+1)th executive as input data of the (n+2)th executive, and writing the execution result into an idle memory block of the (n+2)th executive;

S5, reclaiming, by the nth executive, the memory block sent to the (n+1)th executive; and S6, executing, by the last executive, the self-kernel function computation; writing the execution result to a memory block of the last executive; and reclaiming the memory block on its own immediately at the end of the execution.

2. The pipelining and parallelizing graph execution method for neural network model computation according to claim 1, wherein before executing the self-kernel function computation, an executive may check whether there is an idle memory block in the executive, execute the self-kernel function computation on the ith batch of subdata under the condition that there is an idle memory block, and otherwise, instruct the ith batch to wait for an idle memory block.

3. The pipelining and parallelizing graph execution method for neural network model computation according to claim 2, wherein for an (N*n+1)th batch of subdata, before executing the self-kernel function computation, the executive may check whether the executive where an (N*n−1)th batch of subdata is located completes execution, wherein n is a positive integer.

4. The pipelining and parallelizing graph execution method for neural network model computation according to claim 1, wherein the step S5 specifically comprises the following operations:

S51, informing, by the (n+1)th executive, the nth executive that the memory block sent to the (n+1)th executive has been consumed;

S52, reclaiming, by the nth executive, the memory block sent to the (n+1)th executive, and marking the memory block as being free.

5. The pipelining and parallelizing graph execution method for neural network model computation according to claim 1, further comprising constructing an executive, wherein the constructing an executive specifically comprises the following substeps:

S01, creating an operator kernel function task queue: adding a current operator kernel function computation task into a current kernel function task queue in sequence;

S02, creating a thread of an executive: acquiring, by the thread of the executive, a current task to be processed in sequence from the kernel function task queue, and submitting the current task to be processed to a thread pool;

S03, creating an executive of a kernel function: creating an executive used for operator kernel function computation according to a current kernel function task and context information of a current thread, and using the executive to run the kernel function task in the task queue;

S04, creating an event recall queue: adding tasks that have been processed by a task executive into an event recall queue;

S05, creating a thread of the event recall queue: taking out and returning, by the thread of the event recall queue, the tasks that have been processed in the event recall queue.

6. A neural network model computation-oriented graph execution apparatus, comprising an executive construction module and an executive pipelining and parallelizing working module, wherein the executive construction module is configured to construct an executive; and the executive pipelining and parallelizing working module is configured to implement the pipelining and parallelizing graph execution method for neural network model computation according to claim 1.

7. A neural network model computation-oriented graph execution apparatus, comprising a memory and one or more processors, wherein the memory stores an executable code; and the one or more processors, when executing the executable code, implement the pipelining and parallelizing graph execution method for neural network model computation according to claim 1.

8. A computer-readable storage medium on which a program is stored, wherein the program, when executed by a processor, implements the pipelining and parallelizing graph execution method for neural network model computation according to claim 1.

* * * * *